(12) United States Patent
Logel et al.

(10) Patent No.: US 6,502,969 B2
(45) Date of Patent: Jan. 7, 2003

(54) LIGHT ARRANGEMENT

(75) Inventors: Valère Logel; Samuel Lozano, both of Garches (FR); Bernd Merz, Frickenhausen (DE)

(73) Assignee: Sidler GmbH & Co., Tubingen (DE)

( * ) Notice: Subject to any disclaimer, the term of this patent is extended or adjusted under 35 U.S.C. 154(b) by 0 days.

(21) Appl. No.: 09/812,018

(22) Filed: Mar. 19, 2001

(65) Prior Publication Data
US 2001/0033493 A1 Oct. 25, 2001

(30) Foreign Application Priority Data

Mar. 21, 2000 (DE) .......................................... 100 13 922

(51) Int. Cl.[7] .......................................... F21W 101/02
(52) U.S. Cl. ........................ 362/490; 362/546; 362/324; 362/282
(58) Field of Search ................................. 362/490, 493, 362/546, 324, 282, 277, 279

(56) References Cited

U.S. PATENT DOCUMENTS

| 2,957,073 A | * | 10/1960 | Legge .......................... 362/490 |
| 4,609,976 A | * | 9/1986 | Geissler ....................... 362/202 |
| 5,508,897 A | * | 4/1996 | Van Order .................... 362/490 |
| 5,526,241 A | * | 6/1996 | Ferrell ......................... 362/279 |
| 5,697,693 A | * | 12/1997 | Wittkopp, Jr. et al. ....... 362/490 |
| 5,951,155 A | * | 9/1999 | Lanser ......................... 362/490 |

FOREIGN PATENT DOCUMENTS

DE          1 967 071          8/1967

OTHER PUBLICATIONS

* English Abstract of DE–GM 1 967 071.

* cited by examiner

Primary Examiner—Laura K. Tso
(74) Attorney, Agent, or Firm—Reed Smith LLP

(57) ABSTRACT

A light arrangement for a vehicle which includes a light housing from which light from a light source emerges through a first outlet opening. At least a second light outlet is also provided on the light housing. Moreover, at least one screen section is movably disposed, in the light housing which either covers or releases the path of rays of the light between light source and second outlet opening. A bulb can thus either meet an interior or reading light function which saves components, cost and space.

18 Claims, 4 Drawing Sheets

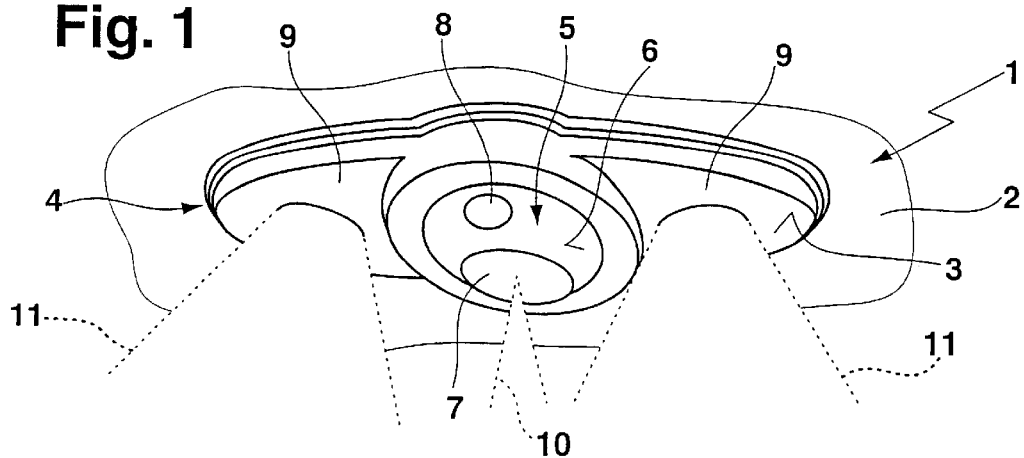
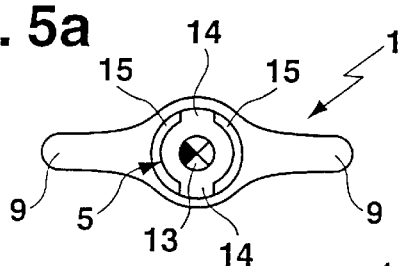
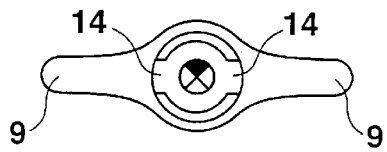
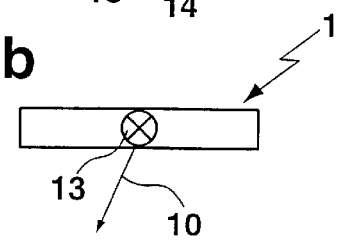
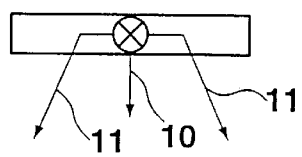
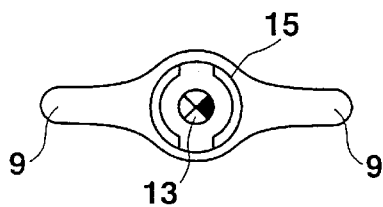
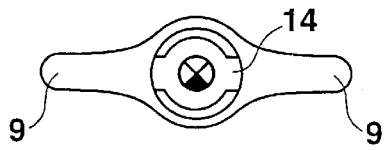
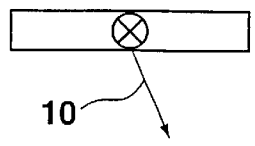
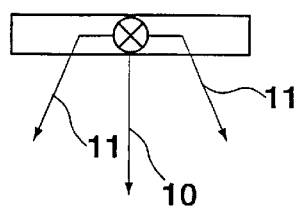

LIGHT ARRANGEMENT

RELATED APPLICATIONS

This application claims Paris Convention priority of German patent application number 100 13 922.1-33 filed on Mar. 21, 2000, the complete disclosure of which is hereby incorporated by reference.

BACKGROUND OF THE INVENTION

A. Field of the Invention

The present invention relates to a light arrangement for a vehicle and ore particularly to a light arrangement for a vehicle with a light housing from which the light of a light source emerges through an outlet opening.

B. Background

Simple interior lights of vehicles are known which comprise only one light source and only serve to illuminate inner large surfaces. Moreover, there are pure reading lights having a bulb as reading light such as a driver or co-driver reading light. Finally, also combined interior and reading lights are known for which separate bulbs are used for the various functions. These known lights either have limited functional scope. That is known lights function only as a reading light or only as an interior light. In addition, known lights require several bulbs to be used for the various functions which means more components are required, i.e. several bulbs, fittings and contacts, thereby increasing cost and space requirements.

It is therefore the underlying purpose of the invention to further develop a light arrangement of the initially mentioned kind with as few parts as possible and low cost into a combined interior and reading light

SUMMARY OF THE INVENTION

This object is achieved in accordance with the invention in that the light housing is provided with at least one further (second) outlet opening for the light and that at least one screen section is movably disposed in the light housing which either covers or exposes the path of rays of the light between light source and second outlet opening.

The advantage achieved with the invention consists in that only one bulb can fulfil the interior and reading light function. This allows to save components, cost and space. Mechanical screens either expose or block the path of rays to the corresponding outlet openings or surfaces.

In a particularly preferred embodiment, each screen section is provided on a switch button rotatably disposed in the light housing. Depending on the turning position of the switch button, the path of rays of the light between light source and second outlet opening is closed or at least partly open.

In a preferred further development of this embodiment, each screen section is formed by a wall section of a circumferential wall of the switch button, wherein neighboring screen sections are spaced apart in each case by an opening section in the circumferential wall.

Preferably, the light source is disposed in an interior space of the switch button whose front side may also be provided with the first outlet opening. The first outlet opening may be formed as separate light disc, possibly with integrated reading light optics.

In another preferred further development, at least part of the light radiated by the light source leaves the first outlet opening at an angle. This measure has the advantage that the light emerging from the first outlet opening is directed to the driver or co-driver in corresponding rotary positions of the switch button. The angle of the emerging light can be achieved e.g. by a reading light optics provided on the switch button, in particular, on the first outlet opening. Inclination of the emerging light can also be achieved by a reflector disposed in the switch button.

Preferably, each of the two sides of the switch button is provided with a second outlet opening. This second outlet opening may be a light disc or be formed by a housing wall which is transparent in this area.

In a further preferred development, sliding contacts, which are electrically connected with the light source, are provided on the switch button which cooperate in certain rotary positions of the switch button with contacts of a contacting means mounted on the light housing. The switch button does not only serve for manipulating the path of rays leading to the second outlet opening but also for switching the light arrangement on and off.

In the invention, it is preferred that the light emerging from the first outlet opening is formed as focussed reading light and the light emerging from the second outlet opening (s) is formed as flatly emerging interior light.

Further advantages of the invention can be extracted from the description and the drawing. The features mentioned above and below may be used in accordance with the invention either individually or collectively in any arbitrary combination. The embodiments shown and described are not to be understood as exhaustive enumeration but rather have exemplary character for describing the invention.

BRIEF DESCRIPTION OF THE DRAWING

FIG. 1 shows a perspective inclined schematic view from below of the light arrangement disposed at the inside roof lining of a vehicle;

FIGS. 5 through 8 schematically show different paths of rays of the light arrangement shown in FIGS. 2 and 3, in each case from the top onto the light arrangement with removed upper housing half (a) and in a side view (b).

DESCRIPTION OF THE PREFERRED EMBODIMENT

Figure 2:
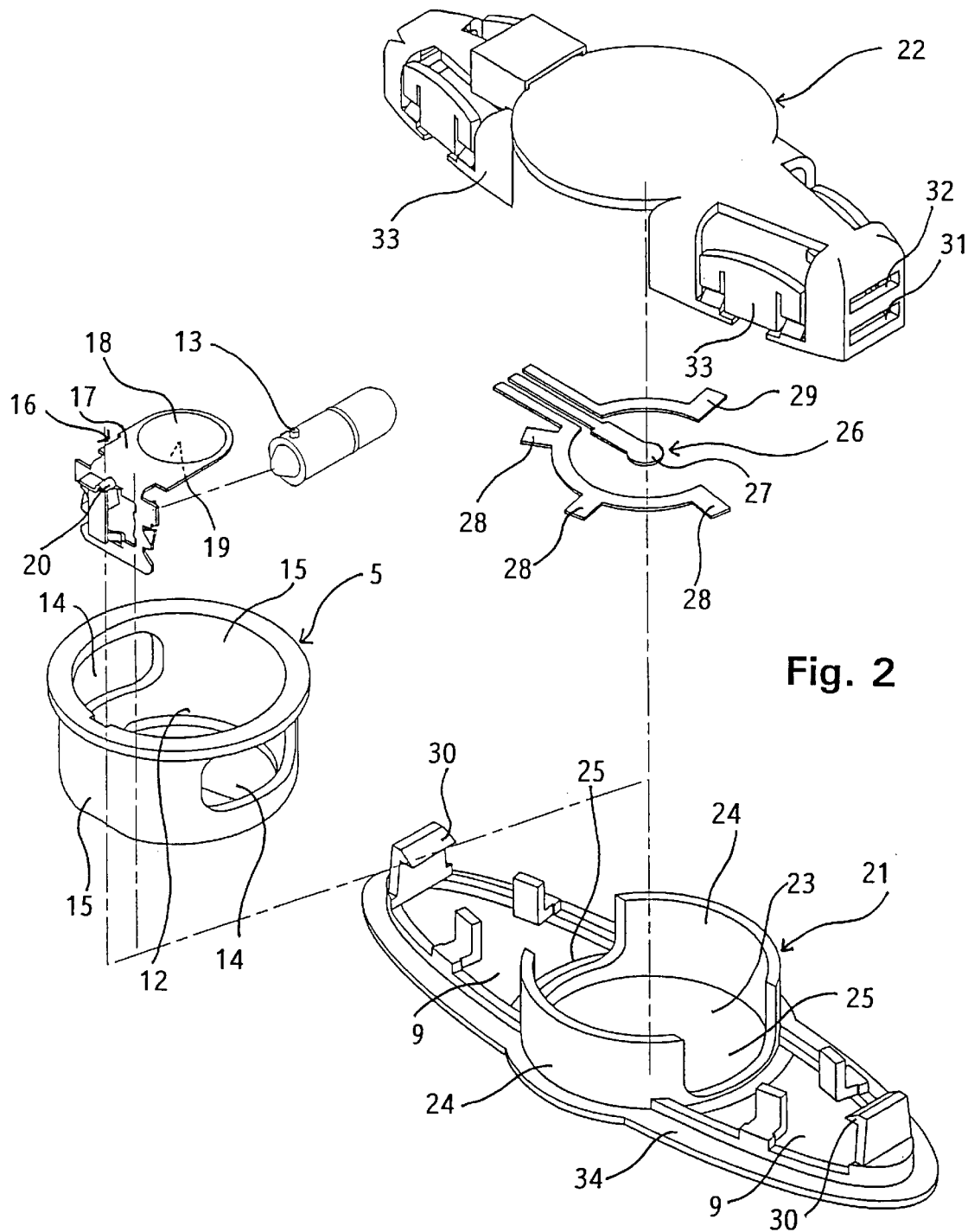
FIG. 2 shows an exploded view of a first embodiment of the light arrangement shown in FIG. 1 with a horizontally disposed bulb.

The light arrangement generally designated with 1 in FIG. 1 is mounted in the interior of a vehicle, i.e. on the inside roof lining 2 and serves as reading light and optionally also as interior light for the inside.

A switch button 5 is rotatably mounted on the front side 3 of the extended light housing 4 which is visible when the light arrangement 1 is mounted. On its visible front side 6, the switch button 5 comprises a transparent central window 7 and a finger depression 8 such that a passenger can easily turn the switch button 5 from the outside. The front side comprises, on both sides of the switch button 5, one transparent side window 9 in each case. The light housing 4 is provided with a light source (not shown in FIG. 1) whose light emerges through the central window 7 as reading light 10 and through the side windows 9 as inside light 11. The reading light 10 emerges as focussed light cone from the central window 7 and the interior light 11 emerges flatly as diffused light from the side windows 9. On the one hand, the light source can be switched on and off via the switch button 5 and on the other hand the inside light 10 can additionally be switched on or off.

FIG. 2 shows a first embodiment of the light arrangement 1. The interior 12 of the pot-shaped switch button 5 is provided with a bulb 13 as light source of the light arrangement 1 disposed transverse to the longitudinal axis of the switch button 5 (i.e. horizontally). The light of the bulb 13 can emerge from the interior 12 at the front side via the central window 7 and at the circumference via two opposing opening sections 14 in the cylindrical circumferential wall of the switch button S. Opening sections 14 and closed screen sections 15 are alternately provided in the circumferential direction of the circumferential wall. The screen sections 15 of the switch button 5 are impervious to light and the central window 7 is a separate light disc.

A fitting 16 mounted on the switch button 5 for the bulb 13 surrounds the bulb 13 with a first contact section 17 which has a first sliding contact 18 on its one side. On its other side facing the bulb 13, the contact section 17 is formed as reflector 19 which reflects the light, radiated backwards by the bulb 13 to the front onto the central window 7 of the switch button 5. The fitting 16 is provided with one further second sliding contact 20 which is electrically insulated from the first sliding contact 18 wherein both sliding contacts 18,20 are in each case connected in an electrically conducting fashion with the two fitting contacts for the bulb 13. A reading light optics is integrated in the central window 7 which deflects the emerging light to exit the central window 7 at an inclined angle.

The light housing 4 is formed by a lower and an upper housing half 21, 22 which are locked with one another. The front side 6 of the switch button 5 is inserted into a circular opening 23 in the lower housing half 21, wherein two cylindrical wall sections 24 of the lower housing half 21 serve as support shells for the switch button 5. Two opposite wall openings 25, each bordering the side windows 9, are provided between the two cylindrical wall sections 24. Through turning of the switch button 5 either its opening sections 14 or its screen sections 15 can be turned in front of the wall openings 25 wherein the opening sections 14 and the wall sections 25 are approximately the same size.

An electric contact means 26 comprising three contact fingers 27, 28, 29 is inserted into the inside of the upper housing half 22. The central contact finger 27 is in constant sliding contact with the first sliding contact 18. These three contact fingers 28 and the contact finger 29 are arranged each at an angular separation of approximately 90° on the turning circle described by the second sliding contact 20 when turning the switch button 5. When the second sliding contact 20 has been turned to the contact finger 29, the bulb 13 is activated only upon opening of a vehicle door whereas the bulb 13 is immediately switched on through setting to the contact fingers 28. In all other rotary positions of the switch button 11, the bulb 13 remains switched off. In total, there are four rotary positions (90° positions) of the switch button 11 in which the bulb 13 can be switched on. This allows switching off of the light arrangement 1 through setting the switch button onto an intermediate rotary position, e.g. 45° position.

Figure 3A:
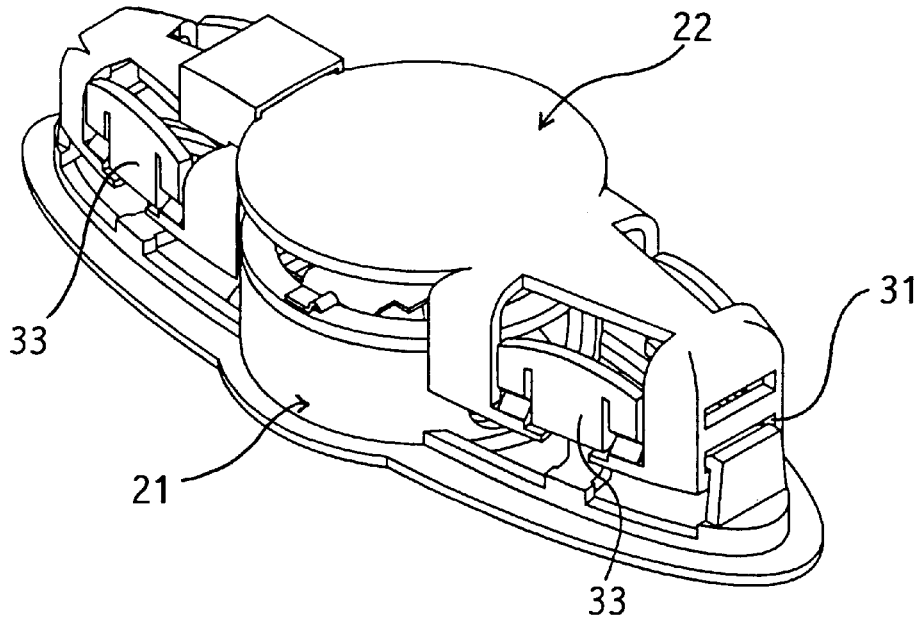
FIGS. 3a and 3b respectively show the light arrangement of FIG. 2 in the pre-mounted state and in the finally assembled state.
Figure 3B:
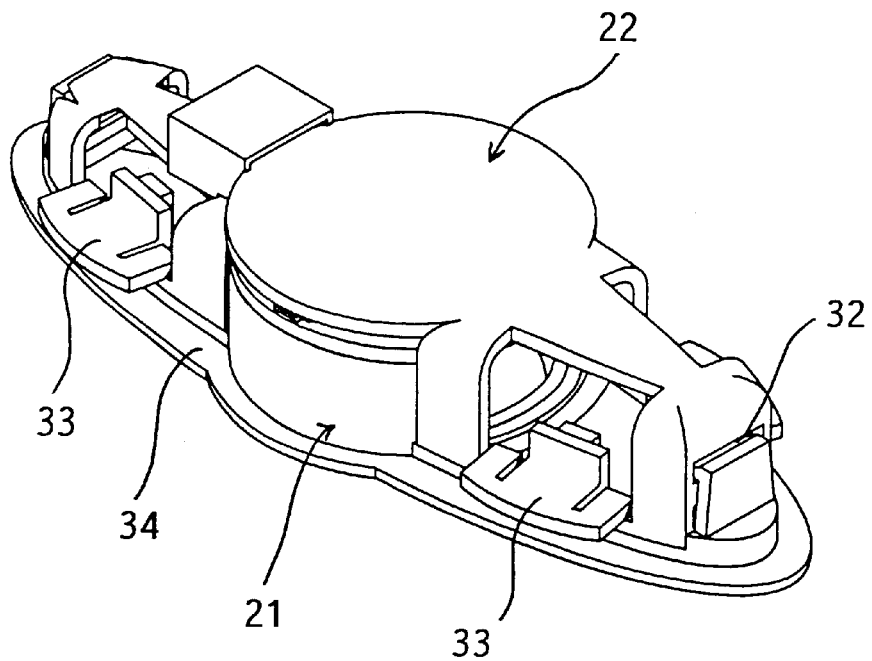

Referring to FIGS. 3a and 3b, for locking the two housing halves 21, 22, both longitudinal ends of the lower housing halves 21 are each provided with a catch 30 which, when the light arrangement 1 has been pre-mounted (FIG. 3a) engages into a lower catch opening 31 and when the light arrangement 1 has been finally mounted (FIG. 3b), engages into an upper catch opening 32 of the upper housing half 22. The two housing halves 21, 22 are extruded parts, wherein the lower housing half 21 is pervious to light at least in the region of its side windows but may also be formed completely of transparent material. Two flaps 33 are pivotally disposed on the two sides of the upper housing half 22 which, after inserting the light arrangement 1 into the corresponding opening in the inner roof lining 2 are folded down on an edge 34 extending along the lower housing half 22 (FIG. 3b). Thus, the inner roof lining 2 is clamped between flaps 33 and edge 34 thereby fastening the light arrangement 1 on the inner roof lining 2.

Figure 4:
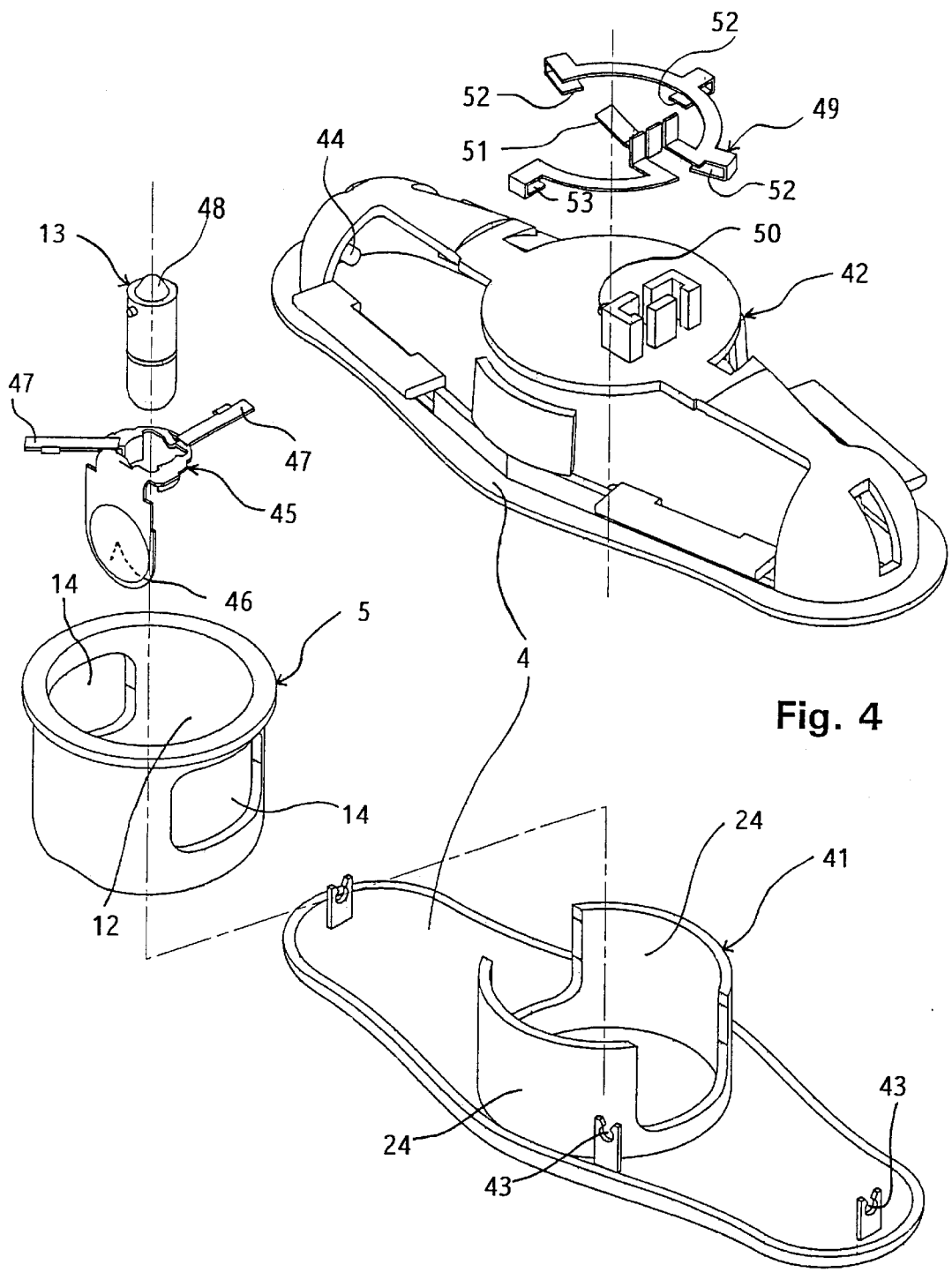
FIG. 4 shows an exploded view of a second embodiment of the light arrangement shown in FIG. 1 comprising a perpendicularly disposed bulb.

FIG. 4 shows a second embodiment of the light arrangement 1, wherein functionally equal components have identical reference numerals. The bulb 13 is disposed in the switch button 5 along its central axis such that the switch button 5, the two cylindrical wall sections 24 and thus the entire light housing 4 are higher than the light housing of FIGS. 2 and 3. The two housing halves 41, 42 are connected via four clip connections. Towards this end, four clamping openings 43, open to the top, are provided in each case on the longitudinal ends and on the two longitudinal sides on the lower housing part 41, into which pins 44 of the upper housing half 42 are clamped when the housing halves 41, 42 are connected.

The fitting 45 for the bulb 13 is centered above the inner space 12 of the switch button 5 and supports a reflector 46 which reflects the light reflected by the bulb 13 onto the central window 7 of the switch button 5. The fitting 45 is provided with two sliding contacts 47 for the one light contact which are disposed with respect to one another at an angle of approximately 135°. The sliding contact 48 for the other light contact is formed by the connecting end of the bulb 13.

The electric contacting means 49 is mounted at the outside of the upper housing half 42. The connecting end 48 of the bulb 13 projecting through a hole 50 in the upper side of the upper housing half 42 is in constant sliding contact with an inner contact finger 51 of the contact means 49. The other contact fingers 52, 53 are bent about the upper-sided edge of the upper housing half 42 and disposed at an angular separation of approximately 90° on the turning circle which the two sliding contacts 47 describe when turning the switch button 5. When one of the two sliding contacts 47 is turned towards the one contact finger 53, the bulb 13 is activated only upon opening of a vehicle door whereas by setting one of the two sliding contacts 47 to one 52 of the contact fingers, the bulb 13 is immediately switched on. The bulb 13 is switched off at all other rotary positions of the switch button 5. Due to the two sliding contacts 47, there are altogether eight rotary positions of the switch button 5 in which the bulb 13 can be switched on.

FIGS. 5 to 8 schematically show the path of rays for the light arrangements 1 of FIGS. 2 and 3 in dependence on the different rotary positions of the switch button 5. FIGS. 5a, 6a, 7a and 8a each show, through black marking in the schematically shown bulb 13, the spatial angular region into which the light deflected by the reading light optics emerges at an inclined angle through the central window 7.

In the rotary position of the switch button 5 shown in FIG. 5a, the wall sections 15 interrupt the path of rays between bulb 13 and side windows 9. Only the reading light 10 from the central window 7 can emerge out of the light arrangement 1, i.e. as shown in FIG. 5b, at an inclined angle towards the left-hand side bottom, i.e. towards the driver.

By turning the switch button 5 about 90° in a clock-wise direction, the rotary position shown in FIG. 6a results from FIG. 5a, in which the opening sections 14 of the switch button 5 expose the path of rays towards the side windows. Both, the reading light 10 from the central window 7 and the interior light 11 from the two side windows 9 emerge from the light arrangement 1. The reading light 10 emerges in an inclined angle towards the rear shown in the side view of FIG. 6b.

By turning the switch button 5 about 90° in a clockwise direction, one obtains, from FIG. 6a, the rotary position shown in FIG. 7a, in which the wall sections 15 again interrupt the path of rays between bulb 13 and side windows 9. Therefore, only the reading light 10 emerges from the central window 7 of the light arrangement 1, i.e. as shown in FIG. 7b at an inclined angle towards the right-hand bottom, i.e. towards the co-driver.

By turning the switch button 5 about 90° in a clock-wise direction, one obtains, from FIG. 7a, the rotary position shown in FIG. 8a, in which the opening sections 14 of the switch button 5 again expose the path of rays towards the side windows 9. The reading light 10 emerges out of the light arrangement 1 through the central window 7 and the interior light 11 from the two side windows 9. The reading light 10 emerges at an inclined angle towards the front, shown in the side view of FIG. 8b. The bulb 13 is electrically connected with the door contact in this rotary position, i.e. the bulb 13 radiates only when the vehicle door is open.

In the light arrangement of FIG. 4, the bulb 13 is switched also in the rotary intermediate positions (45°, 135°, 225°, 315°) of the switch button 5, disposed between the rotary positions shown in FIGS. 5 through 8, due to the angularly displaced two sliding contacts 47. In these rotary intermediate positions, the wall sections 15 still partially cover the two wall openings 25 such that the inside light 11, compared with the rotary at positions of FIGS. 5 and 7 emerges with less brightness.

The present invention is not to be limited in scope by the preferred embodiments described in the specification. Additional advantages and modifications, which will readily occur to those skilled in the art from consideration of specification and practice of the invention are intended to be within the spirit and scope of the following claims.

We claim:

1. A light arrangement for a vehicle, said arrangement comprising:
    a light housing, said light housing further including a first outlet opening from which light from a light source can emerge and at least a second outlet opening for light; and
    at least one screen section which is movably mounted in the light housing and which either covers or exposes the path of rays of light between light source and second outlet opening;
    wherein each of said at least one screen section is provided on a switch button rotatably disposed in the light housing.

2. The light arrangement according to claim 1, wherein each of said at least one screen section is formed by a wall section of a circumferential wall of the switch button, and neighboring screen sections are spaced apart by an opening section in the circumferential wall.

3. The light arrangement according to claim 1, wherein the light source is disposed in a central part of the switch button.

4. The light arrangement according to claim 1, wherein the first outlet opening is provided in the front side of the switch button.

5. The light arrangement according to claim 1, wherein at least part of the light radiated by the light source emerges from the first outlet opening at an inclined angle.

6. The light arrangement according to claim 5, wherein an optics is provided at the switch button, in particular, at the first outlet opening for the light emerging at an inclined angle from the first outlet opening.

7. The light arrangement according to claim 1, wherein a second outlet opening is provided on both sides of the light housing.

8. The light arrangement according to claim 1, wherein sliding contacts are provided on the switch button which are electrically connected with the light source and cooperate, at certain rotary positions of the switch button, with contacts of a contacting means mounted on the light housing.

9. The light arrangement according to claim 1, wherein:
    each of said at least one screen section is formed by a wall section of a circumferential wall of the switch button, and neighboring screen sections are spaced apart in each case by an opening section in the circumferential wall;
    the light source is disposed in a central part of the switch button;
    the first outlet opening is provided in the front side of the switch button;
    at least part of the light radiated by the light source emerges from the first outlet opening at an inclined angle;
    an optics is provided at the switch button, in particular, at the first outlet opening for the light emerging at an inclined angle from the first outlet opening;
    a second outlet opening is provided on both sides of the light housing; and,
    sliding contacts are provided on the switch button which are electrically connected with the light source and cooperate, at certain rotary positions of the switch button, with contacts of a contacting means mounted on the light housing.

10. A light arrangement for a vehicle, comprising:
    a light housing including a first outlet opening from which light from a light source emerges and a second outlet opening from which light from the light source emerges;
    a screen movably mounted in the light housing and operable to cover or expose the light between the light source and the second outlet opening; and
    a switch button rotatably disposed in the light housing and operable to move the screen to cover or expose the light.

11. The light arrangement according to claim 10, wherein the screen is a part of a wall section of a circumferential wall of the switch button.

12. The light arrangement according to claim 10, wherein the screen:
    is a part of a wall section of a circumferential wall of the switch button; and
    includes a first opening section disposed on the circumferential wall of the switch button and a second opening section disposed on the opposite side of the first opening section.

13. The light arrangement according to claim 10, wherein the light source is disposed in a central part of the switch button.

14. The light arrangement according to claim 10, wherein the first outlet opening is a center opening provided in a front side of the switch button.

15. The light arrangement according to claim 10, wherein:
the first outlet opening is a center opening provided in a front side of the switch button; and
the screen is a part of a wall section of a circumferential wall of the switch button.

16. The light arrangement according to claim 10, wherein the light from the light source emerges from the first outlet opening at an inclined angle.

17. The light arrangement according to claim 10, further comprising an optics disposed at the first outlet opening and operable to deflect the light to exit the first outlet opening at an inclined angle.

18. The light arrangement according to claim 10, wherein the light housing includes a third outlet opening on the opposite side of the second outlet opening, and the first outlet opening is disposed in the middle of the second and third outlet openings.

* * * * *